United States Patent [19]

Garro et al.

[11] Patent Number: 5,362,793
[45] Date of Patent: Nov. 8, 1994

[54] ELASTOMERIC COMPOSITION FOR TIRE TREADS

[75] Inventors: Luciano Garro; Mario Martin, both of Milan, Italy

[73] Assignee: Pirelli Coordinamento Pneumatici S.p.A., Milan, Italy

[21] Appl. No.: 58,808

[22] Filed: May 10, 1993

Related U.S. Application Data

[63] Continuation of Ser. No. 673,320, Mar. 22, 1991, abandoned.

[30] Foreign Application Priority Data

Mar. 23, 1990 [IT] Italy .................................. 19781A90

[51] Int. Cl.$^5$ ................................................ C08K 3/04
[52] U.S. Cl. ..................................... 524/495; 524/496; 524/296
[58] Field of Search ......................... 524/495, 496, 296

[56] References Cited

U.S. PATENT DOCUMENTS

| | | | |
|---|---|---|---|
| 3,664,403 | 5/1972 | Doran et al. | 524/575.5 |
| 3,768,537 | 10/1973 | Hess et al. | 524/571 |
| 3,873,489 | 3/1975 | Thurn et al. | 524/552 |
| 3,881,536 | 5/1975 | Doran Jr. et al. | 524/575.5 |
| 3,949,800 | 4/1976 | Lejeune | 152/547 |
| 4,143,027 | 3/1979 | Sollman et al. | 524/571 |
| 4,420,025 | 12/1983 | Ghilardi et al. | 152/531 |
| 4,431,755 | 2/1984 | Weber et al. | 524/575 |
| 4,436,847 | 3/1984 | Wagner | 524/575 |
| 4,485,205 | 11/1984 | Fujimaki et al. | 524/526 |
| 4,640,952 | 2/1987 | Takiguchi et al. | 524/296 |
| 4,748,168 | 5/1988 | Kawakami et al. | 524/474 |
| 4,786,680 | 11/1988 | Suzuki et al. | 524/495 |
| 4,820,751 | 4/1989 | Takeshita et al. | 524/495 |
| 5,007,471 | 4/1991 | Maiocchi | 245/1.5 |

FOREIGN PATENT DOCUMENTS

| | | |
|---|---|---|
| 0288986 | 11/1988 | European Pat. Off. . |
| 63-240405 | 10/1988 | Japan . |
| 01197540 | 8/1989 | Japan . |

*Primary Examiner*—Edward J. Cain
*Attorney, Agent, or Firm*—Stevens, Davis, Miller & Mosher

[57] ABSTRACT

An elasomeric mix for pneumatic tire treads to enhance driving behavior including road holding ability on wet surfaces, abrasion resistance and low rolling resistance. The inventive elastomeric mix on $E''/E'$ ratio dynamic moduli value equal to or greater than 0.3 at 0° C. and equal to or less than 0.16 at 70° C. The mix is based upon natural rubber and lampblack comprising, for 100 parts of elastomer, from 5 to 20 parts by weight of a synthetic polymer selected from the group consisting polychloroprene, chlorinated butyl rubber and brominated butyl rubber.

11 Claims, No Drawings

ELASTOMERIC COMPOSITION FOR TIRE TREADS

This application is a continuation of application Ser. No. 07/673,320, filed Mar. 22, 1991 now abandoned.

BACKGROUND OF THE INVENTION

The present invention relates to the elastomer mixes used in the manufacture of tires for motor vehicles and in particular it relates to elastomer mixes selected for the preparation of a tire tread strip. The invention relates more specifically to tires having enhanced performance resulting from the use of the above mixes in the tire strip and the method for obtaining such tires.

It is known that motor vehicle tires comprise a toroidal-shaped carcass, to be mounted on a wheel rim, internally hollow and inflated with air under pressure to allow the operation of the tire. In the tire crown, that is, in a radially external position, the tire has a thick strip (tread strip or more simply "tread") of an appropriate elastomeric composition, hereinafter called a "mix", onto which a tread design is impressed.

It is also known that different characteristics of the tire's behavior and performance depend to a not negligible extent on the characteristics of the above tread mix: as an example, it is sufficient to mention resistance to abrasion, which determines length of the life of the tire, road-holding features on dry as well as wet surfaces, resistance to rolling, properties of energy dissipation and drivability.

A specific type of use to which tires used for heavy truck vehicles are subjected is that, distinguishable into two variants, commonly known to the experts as "ON" and "SUPER-ON", which substantially indicate the use of the tire on vehicles with a high loading capacity, which run prevalently (ON) or almost exclusively (SUPER-ON) at high operating speeds, on substantially rectilinear and flat roads, in good or better surface conditions, such as interstate highways.

These tires ape generally distinguished by a tread design of the so-called "ruled" type, that is comprising a plurality of continuous circumferential ribs, axially separated one from the other by longitudinal grooves, circumferentially continuous, with a zig-zag pattern, or of the type having small blocks with a high tractability.

With this type of operation the qualities of good road-holding under all surface conditions, of response to driving conditions, of low tearability, of low Polling resistance, and of resistance to wear under low severity conditions, such as those indeed presented by the above-mentioned types of roads, acquire particular importance.

Unfortunately several of these characteristics one substantially incompatible with one another, in the sense that mixes outstanding as regards some of them are generally poor as regards the others, such as, for example, mixes based on natural rubber which ape highly resistant to tear and have a low Polling resistance but frequently have an insufficient road-holding features and high abradability.

The addition in the recipe of these mixes of given quantities of specific elastomeric materials (for example, styrene-butadiene rubbers) on the one hand raises road-holding ability and resistance to abrasion but, at the same time, worsens rolling resistance and tearability under certain operating conditions.

In this way the expert is obliged to look for the best possible compromise between the different characteristics in view of all the possible features of performance required of a specific type of tire.

In order indeed to reach the best compromise in relation to that particular type of use, the current state of the art utilizes for the uses specified above different types of tread mix.

These types of mix use natural rubber as an elastomeric material, in combination with appropriate charges of other specific materials (lampblack, vulcanization regulators, anti-aging products, etc.) and can also contain other reinforcing charges in siliceous materials for the purpose of suitably changing certain of their characteristics.

Two characteristics of the tire that are very important for the safety of road and motorway transport are behavior on a dry surface and road-holding on a wet surface.

These two characteristics determine the possibility of controlling the direction of the motor vehicle, preventing dangerous swerves, even under emergency conditions due, say, to a sudden obstacle to be avoided.

These characteristics are measured by means of the assessment of the behavior of the tire mounted on the vehicle, driven along a specific type of route.

The assessment can be carried out on the basis of a feeling on the part of the test driver or by means of the measurement of time and speed.

On the basis of tests carried out by the Applicant with radial tubeless truck vehicle tires, size 315/80 R 22.5, provided with different types of tread mixes, the behavior on dry surfaces and road-holding features on wet surfaces have been shown to be mathematically correlatable with the dynamic properties of the tread mixes, expressed by the parameters: $E'$=elastic modulus (which measures the energy conserved and recovered during a cyclic deformation); $E''$=viscous modulus (which measures the energy dissipated as heat during a cyclic deformation); tang $\delta = E''/E'$.

Another characteristic of fundamental importance in truck vehicle tires is the rolling resistance, that is the energy dissipated during rolling. This property, as is known to experts in the field, affects not only fuel consumption but also the useful life of the tire.

In fact the higher the Polling resistance the higher the tire's operating temperature and the quicker are those processes of chemical and physical decay of the materials which lead to the tire having to be discarded.

The Applicant, carrying out tests still with the above-mentioned tires size 315/80 R 22.5 and using different tread mixes has found a correlation between the dynamic properties of the tread mixes and the rolling resistance, which can both be expressed in relation to tang $\delta$.

THE PRIOR ART

According to the current state of the art, in order to enhance the behavior on a dry surface as well as features of road-holding on a wet surface it is possible to use appropriate mixes (blends) of natural rubber (NR) with the two synthetic rubbers commonly used in tread mixes for motor cars or light truck tires, that is the styrene-butadiene copolymer (SBR) and polybutadiene (BR). More in particular, it is possible to use NR/SBR blends or NR/BR blends or also NR/SBR/BR blends containing at least 50 parts by weight of natural rubber.

It must be clear that all abreviations adopted for the mixes in the present description have the exclusive purpose of facilitating the reading of the text and of the tables comparing the different mixes without any limiting intent, especially with reference to their features of any kind.

As shall be shown later, these formulations attain the objective but; to the detriment of a worsening (increase) in rolling resistance, with the negative consequences described earlier.

SUMMARY OF THE INVENTION

The Applicant has now discovered that it is possible to appreciably enhance the qualitative level of current tires, in particular those for heavy truck vehicles provided with a tread strip in natural rubber, adopted in "ON" type and "SUPER-ON" type operations, using a specific type of blend for natural rubber, that is a mixture of the base elastomer with specific synthetic polymers, so that the object of the present invention is the definition of an elastomeric composition, specifically for treads strips, which allows the enhancement in tires of road-holding features in particular, both on dry and on wet surfaces, without increasing rolling resistance to any significant extent and without compromising the current qualitative level of the other characteristics of the mix and of the tire, both as regards the product obtained and the production process followed.

Thus, in a first embodiment the present invention relates in a general manner to a tire for vehicle wheels comprising a carcass, a tread strip placed as a crown to such carcass, as well as sides and beads for anchoring said tire to a corresponding assembly rim, characterized in that said tread strip is made with a mix based on natural rubber and lampblack having a value of the $E''/E'$ ratio, that is, a value of tang $\delta \geq 0.3$ at a temperature of 0° C. and $\leq 0.16$ at a temperature of 70° C.

In a second more specific embodiment the present invention relates to a tire of the type with no inner tube, usually better known and hereinafter indicated as "tubeless", for wheels of heavy truck vehicles, which comprises a carcass provided with sides and beads for anchoring said tire to a corresponding assembly rim, a tread strip with a relief design and placed as a crown to said carcass and an annular reinforcing structure, circumferentially inextensible, placed between said carcass and said tread strip, said carcass being of a metal singleply radial type with the ends thereof turned up axially from the inside to the outside around a metal annular bead core reinforcing said beads. The core is of the so-called "packet" described in the allowed U.S. application Ser. No. 07/183,639, the desclosure of which is hereby incorporated by reference type, comprising a plurality of turns of bare metal wire, placed in reciprocal contact in both the axial and the radial directions and having, in a plane containing the tire's axis of rotation, a straight cross-section of a polygonal shape whose radially innermost internal side is arranged at an angle of about 15° to said axis of rotation, said tire being characterized in that said tread strip is prepared with a mix based on natural rubber and lampblack having a $E''/E'$ ratio (value of tang $\delta$) $\geq 0.3$ at a temperature of 0° C. and $\leq 0.16$ at a temperature of 70° C.

In a third embodiment the invention also relates to an elastomeric composition (mix) based on natural rubber and lampblack having a $E''/E'$ ratio (value of tang $\delta$) $\geq 0.3$ at a temperature of 0° C. and $\leq 0.16$ at a temperature of 70° C.

Preferably in the above mix the value of the elastic modulus $E'$ is $\geq 8$ MPa at a temperature of 0° C. and 5 MPa at a temperature of 70° C.

DETAILED DESCRIPTION OF THE INVENTION

More specifically such mix, especially in the use with the above tires, is characterized in that, for 100 parts by weight of elastomeric material, it comprises from 80 to 95 parts by weight of natural rubber or of a mix of it with styrene-butadiene and/or with polybutadiene (in the NR/SBR, NR/SBR/BR, NR/BR blends), the natural rubber being present in said mix with at least 50 parts by weight of 100 parts of said mix, so that the sum of the concentrations remains in the range of from 80 to 95 parts per 100 parts by weight of the overall elastomeric material, and correspondingly from 20 to 5 parts by weight of a synthetic polymer selected from the family comprising polychloroprenic rubbers and halogenated butyl rubbers.

Preferably the quantity of the above synthetic polymer ranges from 8 to 15 parts by weight per 100 parts of elastomer, while the quantity of lampblack ranges preferably from 45 to 55 parts by weight per 100 parts of elastomeric material.

In one of its further embodiments, the present invention also relates to a method for enhancing the performance of tires for motor vehicles, especially those used in heavy goods transport, in operations distinguished by high running speeds over long and smooth routes, characterized in that it comprises the step of accomplishing said tread mix with a mixture of elastomers comprising, per 100 parts by weight of elastomeric material:

from 80 to 95 parts by weight of natural rubber or of a mixture of it with styrene-butadiene and/or with polybutadiene, the natural rubber being present in said mixture with at least 50 parts by weight of 100 parts of said mix, and correspondingly from 20 to 5 parts by weight of a synthetic polymer selected from the family comprising polychloroprenic rubbers and halogenated butyl rubbers, specifically polycholoroprene, chlorinated butyl rubber and brominated butyl rubber.

Polycholoroprenic rubbers are intended as the homopolymers of 2-chloro-1,3-butadiene and the copolymers of 2-chloro-1,33-butadiene with dienic monomers such as butadiene and isoprene, having an average molecular weight ranging from $2 \times 10^4$ to $10^6$, whose molecular weight is regulated with the use of molecules containing sulphur or alkylmercaptans and whose Mooney viscosity, measured according to the ASTM specification D 1646, ranges from 20 to 100 ML(1+4), measured at 100° C.

Halogenated butyl rubbers are intended as isobutylene-isoprene copolymers, with an isoprene content of up to 5% in mols, having an average molecular weight ranging from $10^4$ to $10^6$, modified by the action of substances containing chlorine or bromine. Chlorobutyl rubbers have a maximum chlorine content of 3% by weight.

Bromobutyl rubbers have a maximum bromine content of 3% by weight.

The Mooney viscosity of chlorobutyl and bromobutyl rubbers, measured according to the ASTM specification D 1646, ranges from 20 to 60 ML(1+8), at 125° C.

Preferably in the tires and in the mixes according to the invention the quantity of said synthetic polymers included in the above-mentioned elastomeric composition is limited to a range from 8 to 15 parts by weight per 100 parts by weight of elastomeric material.

According to a further preferred method of the invention, in said elastomeric composition the quantity of lampblack contained ranges from 45 to 55 parts by weight per 100 parts by weight of elastomeric material.

These and other objects of the present invention shall now be more easily understood with the help of the following description and of the enclosed tables, provided merely as a non-limiting example, wherein:

Table 1 illustrates the composition of the mix according to the invention compared with the compositions of other mixes known of the state of the art;

Table 2 illustrates, by means of a series of values referring to some dynamic parameters, some features of the mixes of table 1;

Table 3 illustrates the result by comparison of tests of the behavior on the road carried out on samples of radial tubeless goods vehicle tires, size 315/80 R 22.5, provided with treads made with the mix of the invention and with the usual state of the art mixes, respectively, as per Table 1;

Table 4 illustrates, again with a series of values referring to the above dynamic parameters, the effect of different synthetic rubbers in the blend, in increasing quantities, with natural rubbers in a formulation typical of a mix for truck vehicle treads.

The present invention thus relates first of all to tires for motor vehicles and in particular to those tires used for heavy truck vehicles which travel over long routes at high running speed on roads having limited abrasion.

It is known that in its more general form the tire comprises a carcass having a toroidal shape whose sidewalls terminate radially on the inside with two high rigidity areas, known as beads, which have the specific task of firmly anchoring the tire to a corresponding assembly rim.

The carcass may be constituted by one or more reinforcing plies, provided with textile or metal twisted together strands, arranged radially, that is lying in planes containing the tire's axis of rotation, or at an angle to the above-mentioned planes.

The ends of one or more of the carcass plies are turned up axially from the inside to the outside each around a metal annular bead core, known as a bead wire, reinforcing the bead, constituted by a plurality of bare or rubber-coated metal wire turns, according to the type of tire.

The carcass is again completed by a tread strip, placed on the crown and having a tread pattern for contact with the ground, and possibly by a reinforcing annular structure, circumferentially inextensible, better known as a belt, placed between carcass and tread strip, whose presence is essential in the case of radial carcasses for the correct behaviour of the tire on the road.

If we now examine tires specifically designed for use on heavy truck vehicles in operations of the type ON and SUPER-ON these are preferably tubeless tires mounted on channel-type rims with a keying diameter measuring 22.5" and bead seats at an angle of 15° to the rim's axis of rotation.

Such tires comprise a metal single-ply radial carcass whose ends are turned up around the reinforcement wires of the "packet" type; such bead wires, as is well known, comprise a plurality of turns of bare metal wire which touch one another both in the radial direction and in the transverse direction, say according to the illustration in U.S. Pat. No. 3,949,800 or in European patent application EP 288,986 published 2.11.88, in the name of the same Assignee; both disclosures of which are hereby incorporated by reference.

A straight cross-section of the above-mentioned wires, in the plane containing the tire's axis of rotation, is a polygonal figure (say, a rhomboid or a hexagon) with the more radially internal side at an angle in a direction parallel to the corresponding surface of the rim, that is, at about 15° to the above-mentioned axis of rotation.

In these tires the tread strip is provided with a tread pattern specially suitable for continuous service at high speed, say, of the grooved type, that is, comprising a plurality of continuous circumferential ribs separated one from the other by longitudinal grooves, also continuous, generally with a zig-zag pattern, or, remaining within this scope, of the type having small blocks with a high tractability.

Lastly, between the carcass and the tread there is positioned a belt, of any convenient known type, preferably that described in U.S. Pat. No. 4.420.025 issued 13.12.83, (the disclosure of which is hereby incorporated by reference) in the name of the same Assignee, comprising two radially superimposed layers of rubber-coated textile material reinforced with thin metal twisted together strands parallel to one another in each layer, arranged at an angle to the tire's circumferential direction and at right angles to those of the adjacent layer, and on the extremities of said layers, in a radially external position, two radially superimposed strips of rubber-coated material reinforced with thin metal twisted together strands of the type having high elongation, oriented in the circumferential direction.

With the object of enhancing its performance in the uses mentioned above, tires in general but especially those for heavy truck vehicles, according to the invention have a tread strip made of an elastomeric composition, also the object of the present invention, whose dynamic parameters $E'$ and $E''$ have values such that their ratio $E''/E'$, better known as tang $\delta$, is $\geq 0.3$ at a temperature of 0° C. and $\leq 0.16$ at a temperature of 70° C.

This result is conveniently attained with an elastomeric composition based on natural rubber blended with a suitable polymer, that is comprising per 100 parts by weight of elastomeric material, a quantity ranging from 80 to 95 parts by weight of natural rubber and a corresponding quantity ranging from 20 to 5 parts by weight of a synthetic polymer selected from the family including:

chloroprenic rubbers,
chlorinated butyl rubbers,
brominated butyl rubbers.

As an alternative, in place of the natural rubber itself (NR) it is also possible to use two of its mixtures (blends) with other polymers and more precisely with styrene-butadiene (SBR) and polybutadiene (BR) in the NR/BR, NR/SBR, NR/SBR/BR combinations, wherein, however, natural rubber constitutes at least 50% by weight.

The polymers indicated above are elastomers in themselves by now well known to the technicians, so that it does not appear necessary here to provide a more detailed description of their chemical constitution; a brief description of the rubbers mentioned in this invention is given, for example, in the book "The Rubber Manual" by Khaizi Nagdi, edited by Tecniche Nuove, the disclosure of which is hereby incorporated by reference. On the basis of the correlations between the characteristics of the tires and the dynamic properties of the tread mixes, as indicated earlier, a mix which enhances road-holding features on wet surfaces and on dry roads and which, at the same time, keeps rolling resistance at levels acceptable for a tire used on heavy truck vehicles in operations of the "ON" and "SUPER-ON" type must simultaneously have the following properties:

$$\tan g\ \delta\ \text{at}\ 0°\ C. \geqq 0.3 \tag{1}$$

$$\tan g\ \delta\ \text{at}\ 70°\ C. \leqq 0.16 \tag{2}$$

and preferably also;

$$E'\ \text{at}\ 0°\ C. \geqq 8\ \text{MPa} \tag{3}$$

$$E''\ \text{at}\ 70°\ C. \geqq 5\ \text{MPa.} \tag{4}$$

The above values have been observed after subjecting a cylindrical specimen of vulcanized mix, having a diameter equal to 18 mm and a height of 25 mm, pre-loaded to compression up to a longitudinal deformation of 20% of its original height and kept at the preset temperature, to a dynamic sinusoidal deformation having a maximum amplitude equal to more or less 7.5% of the height under pre-load, at a frequency of 100 cycles per second (100 Hz).

Table 1 illustrates the formulations of some mixes produced in a plant, on industrial installations, which have been used for the manufacture of the radial tubeless heavy truck vehicle tires mentioned earlier, size 315/80 R 22.5, as indicated in Table 3. Mixes A, C and D, being NR, NR/SBR, NR/BR, respectively, represent the state of the art before the invention, the mix B (NR/Polychloroprene) is typical of the present invention.

Table 2 gives the values of the dynamic properties, mentioned above, of the mixes of table 1. It is obvious from this table that only the mix according to the invention satisfies the four conditions (1), (2), (3), (4), defined above.

Table 3 shows the test results on road behavior carried out with the mentioned heavy truck vehicle tires size 315/80 R 22.5, provided with treads constituted by the mixes A, B, C, D, respectively, as shown in the previous Table 1.

The results are expressed as percentages of those given by the tires having a tread of mix A, in natural rubber only.

It can be seen that mixes C, D, prepared according to the prior art, exhibit a behavior on dry roads, road-holding features on wet surfaces, and a tractability on a smooth and wet surface that are far better that those of mix A but at the same time also have higher Polling resistance.

Thus mixes C and D do not thus constitute a real improvement but only a displacement of the point of equilibrium of the different properties. Mix B, on the other hand, manufactured with a blend of natural rubber and synthetic polymer, as described according to the present invention, attains the objective of having at the same time, with respect to reference A, enhanced properties of driveability while keeping rolling resistance unchanged.

Lastly, Table 4 gives the results of an experiment executed on a group of mixes (M) with a formulation typical for treads of heavy truck vehicles, based on natural rubber (NR) blended with different types and increasing quantities of synthetic polymer (PS) according to the invention, wherein the quantity of polymer used for the blend has been made to range from 5 to 20 parts by weight of polymer for 100 parts by weight of elastomer, with the object of assessing the corresponding variation of the value of the related parameters, indicated with the same numeric reference already used in Table 2.

The formulation used is the same for all mixes in the Table and it is identical with that of mix A, given in Table 1; the difference between the different mixes is only in the type of synthetic polymer used in the blend with the natural rubber.

In addition to the synthetic rubbers of the invention (POLYCHLOROPRENE, CHLOROBUTYL and BROMOBUTYL, respectively) table 4 also gives the results related to natural rubber only (NR) and to blends of natural rubber with other synthetic rubbers (STYRENE-BUTADIENE copolymer. ACRYLONITRILE copolymer, NATURAL EPOXIED RUBBER) commonly used in the tread mixes of tires for motor cars and heavy truck vehicles, to demonstrate that only with the rubbers according to the invention it is possible to obtain the required properties.

The results have not, however, been given relating to mixes which, instead of natural rubber, have mixtures of it with other polymers, as indicated, for example, the NR/SBR blend with the addition of polychloroprene in the proportions according to the present invention.

Such data would have weighted down the description to an unnecessary extent without offering greater information since the absolute values of tang δ and of E', though different from those related to the mixes shown. maintains the same type of reciprocal ratio, expressed by the limit conditions (1), (2), (3), (4) given above.

The mixes of Table 4 have been prepared in the laboratory.

It is obvious from Table 4 that only the mixes of the invention, containing polychloroprene or chlorobutyl rubber of bromobutyl rubber, exhibit the required properties.

In fact the dynamic properties of mix (A) in natural rubber only are such as to give it a good rolling resistance [see (2), that is tang δ at 70° C.≦0.16] but road-holding features on dry and wet surfaces and tractability on wet surfaces are insufficient [because conditions (1) and (3) are not satisfied tang δ at 0° C.≦0.3 and E' at 0° C.≦8 MPa]. And neither do the mixes containing epoxidated natural rubber (H) or the styrene-butadiene copolymer (C) or the butadiene-acrylonitrile copolymer (G) have dynamic properties which satisfy the set of conditions imposed.

Only the mixes according to the invention, containing polychloroprene or chlorinated or brominated butyl rubbers fully satisfy such conditions when the synthetic polymers are present in a concentration equal to or higher than 5 parts by weight.

More specifically it is possible to see that the above interval is certainly valid in the case of use of chlorobutyl (E), while as far as polychloroprene (B) and bromobutyl (F) are concerned, condition (2) is satisfied for a content of synthetic polymer ranging from 5 to 10 parts by weight.

On the other hand, when the concentration of synthetic polymer is 20 parts by weight it is possible to see from the results given that tearing resistance decreases appreciably.

According to the above observations, the preferred concentration of said polymers thus ranges from 8 to 15 parts by weight per 100 parts of elastomer.

The mix according to the invention has demonstrated that it has achieved the proposed objects.

As regards its workability, the quantity of mix necessary for laboratory tests, for all experimental tests and for the manufacture of the tires used in the mentioned tests has been made with an identical process and on the same machines used for the manufacture of the usual known mixes, used as comparison mixes in order to assess the rheometric, static and dynamic characteristics of the mixes according to the invention.

More accurately, the mixes of the invention, prepared according to the known methods of the art, have demonstrated that they have characteristics of processability that are altogether equivalent to the mixes normally used: in other words the processing of such mixes executed on Banbury units, mixers, extruders and calenders, both in the elastomer mixing stage and in the stage wherein the various charges of different materials are absorbed into the elastomer, as well as in the preparation of semi-finished products in the plant, does not cause difficulty of any kind leading to the manufacture of semi-finished products having a quality equal to that of the usual ones, in particular as regards the surface appearance and the degree of porosity.

In addition to that, the tires according to the invention, accomplished with the above mixes, have attained several advantages of usage among which the main ones to be highlighted are better behavior under driving conditions and better road-holding features both on dry and wet surfaces, in particular due to the high hysteresis of the tread mix at low temperatures only, and thus with equal rolling resistance, and a better abrasion resistance especially under conditions of low severity, with the consequent increase in the length of the life of the tire under conditions of the ON and SUPER-ON type.

On the basis of the above it can then be pointed out that the Applicant has also accomplished a new method for enhancing the performance of tires, which thus falls within the scope of the present invention and which is completely described here.

The present description is purely illustrative and not limiting, thus, the expert in the field can make changes and variants, not described here but easily deducible from the present inventive idea, and thus fall within the scope of the present invention.

TABLE 1

| INGREDIENTS AND MIXES | A | B | C | D |
|---|---|---|---|---|
| Natural rubber | 100.00 | 90.00 | 80.00 | 50.00 |
| Sulphur polychloroprene | — | 10.00 | — | — |
| SBR | — | — | 20.00 | 20.00 |
| BR | — | — | — | 30.00 |
| N110 Lampblack | 50.00 | 48.00 | 48.00 | 48.00 |
| Stearic acid | 2 | 2 | 2 | 2 |
| Zinc oxide | 3.5 | 3.5 | 3.5 | 3.5 |
| Sulphur | 1.2 | 1.4 | 1.2 | 1.2 |
| Oxybenzothiazylsulphenamide | 1.5 | 1.6 | 1.6 | 1.6 |
| Anti-oxidant | 1.5 | 1.5 | 1.5 | 1.5 |
| Anti-ozonizer | 1.5 | 1.5 | 1.5 | 1.5 |

TABLE 3

Road tests with radial tubeless tires size 315/80 R 22.5

| MIXES | NATURAL RUBBER A | INVENTION B | PRIOR ART C | PRIOR ART D |
|---|---|---|---|---|
| ROLLING RESISTANCE | 100 | 100 | 110 | 120 |
| BEHAVIOR ON DRY SURFACES | 100 | 115 | 105 | 108 |
| ROAD-HOLDING ON WET SURFACES | 100 | 115 | 110 | 110 |
| TRACTABILITY ON SMOOTH/WET SURFACES | 100 | 120 | 120 | 110 |

TABLE 2

| PARAMETERS AND MIXES | A | B | C | D |
|---|---|---|---|---|
| HYSTERESIS | | | | |
| (1) tg δ 100 Hz 0 °C. | 0.282 | 0.343 | 0.340 | 0.330 |
| (2) tg δ 100 Hz 70 °C. | 0.152 | 0.150 | 0.169 | 0.186 |
| MODULES | | | | |
| (3) E' 100 Hz 0 °C. | 7.56 | 8.80 | 8.21 | 8.49 |
| (4) E' 100 Hz 70 °C. | 4.60 | 5.32 | 4.90 | 5.01 |
| (5) E" 100 Hz 0 °C. | 2.13 | 3.02 | 2.79 | 2.80 |
| (6) E" 100 Hz 70 °C. | 0.70 | 0.80 | 0.83 | 0.93 |
| TEARING RESISTANCE | | | | |
| (7) ASTM/B kN/m | 388 | 358 | 352 | 280 |
| (8) peeling kg/5 mm | 107 | 83 | 82 | 70 |
| ABRASION RESISTANCE | | | | |
| (9) ABRASION DIN mm3 | 122 | 117 | 110 | 100 |

TABLE 4

| M | NR | PS | (1) | (2) | (3) | (4) | (7) | (8) |
|---|---|---|---|---|---|---|---|---|
| NATURAL RUBBER | | | | | | | | |
| A | 100 | 0 | .266 | .145 | 7.02 | 4.90 | 384 | 116 |
| STYRENE-BUTADIENE | | | | | | | | |
| C1 | 95 | 5 | .275 | .154 | 7.08 | 4.77 | 370 | 110 |
| C2 | 90 | 10 | .286 | .162 | 7.60 | 5.82 | 352 | 108 |
| C3 | 80 | 20 | .320 | .166 | 8.01 | 5.17 | 312 | 95 |
| POLYCHLOROPRENE | | | | | | | | |
| B1 | 95 | 5 | .279 | .150 | 8.12 | 5.55 | 370 | 110 |
| B2 | 90 | 10 | .302 | .152 | 8.57 | 5.75 | 356 | 104 |
| B3 | 80 | 20 | .320 | .157 | 10.86 | 6.38 | 282 | 90 |
| CHLOROBUTYL | | | | | | | | |
| E1 | 95 | 5 | .304 | .141 | 7.57 | 4.95 | 355 | 104 |
| E2 | 90 | 10 | .360 | .147 | 8.47 | 5.12 | 325 | 92 |
| E3 | 80 | 20 | .405 | .155 | 9.15 | 5.26 | 305 | 83 |
| BROMOBUTYL | | | | | | | | |
| F1 | 95 | 5 | .285 | .140 | 7.30 | 4.96 | 353 | 105 |
| F2 | 90 | 10 | .335 | .155 | 8.10 | 5.04 | 320 | 102 |
| ACRYLONITRILE | | | | | | | | |
| G1 | 95 | 5 | .299 | .164 | 8.15 | 4.90 | 384 | 114 |
| G2 | 90 | 10 | .331 | .175 | 9.75 | 5.43 | 393 | 129 |
| NATURAL EPOXIED RUBBER | | | | | | | | |
| H1 | 95 | 5 | .281 | .165 | 9.66 | 5.44 | 370 | 112 |
| H2 | 90 | 10 | .327 | .183 | 12.63 | 5.87 | 350 | 108 |

We claim:

1. A tire for a vehicle wheel comprising a carcass, a tread strip on the crown of said carcass, sidewalls and beads for anchoring said tire to corresponding wheel rim, which comprises using in the tread thereof an elastomeric composition of natural rubber and carbon black, containing 100 parts by weight of an elastomeric material of:
   a) from 80 to 95 parts by weight of natural rubber or of a mixture of natural rubber with styrene-butadiene and/or with polybutadiene, the amount of natural rubber being at least 50 parts by weight on 100 parts of said elastomeric composition, and b) from 20 to 5 parts by weight of a synthetic rubber consisting essentially either or homopolymers of 2-chloro-1,3-butadiene or copolymers of the former with dienic monomers, selected from the group consisting of butadiene and isoprene, said synthetic rubber having a molecular weight from $2 \times 10^4$ to $10^6$, and a Mooney viscosity from 20 to 100 ML(1+4), as measured at 100° C. according to ASTM specification D 1646, whereby said elastomeric composition has a loss tangent (tan δ) at 0° C. of not less than 0.30 and a loss tangent (tan δ) at 70° C. of not more than 0.16.

2. A tire as claimed in claim 1, wherein said elastomeric composition has a dynamic storage modulus (E') of not not less than 8 MPa at 0° C. and of not less than 5 MPa at 70° C.

3. A tire as claimed in claim 2, wherein the amount of said synthetic polymer is between 8 and 15 parts by weight per 100 parts of said elastomeric material.

4. A tubeless tire for wheels of heavy vehicles, comprising a carcass having sidewalls and beads for anchoring said tire to a corresponding wheel rim, a treat band with a tread design on the crown of said carcass and an annular reinforcing structure, circumferentially inextensible, positioned between said carcass and said tread band, said carcass being a metal single-ply radial with the ply ends turned up axially from the inside to the outside around a metal annular bead core reinforcing said beads, said bead core comprising a plurality of turns of bare metal wire in contact with each other both along the axial and the radial directions, and having, in a plane containing the tire axis of rotation, a straight cross-section of a polygonal shape whose radially inner side is arranged at an angle of about 15° to said axis of rotation, which comprises using in the tread thereof an elastomeric composition of natural rubber and carbon black, containing for 100 parts by weight of elastomeric material of:

from 80 to 95 parts by weight of natural rubber or a mixture of natural rubber with styrene-butadiene and/or with polybutadiene, the amount of natural rubber being at least 50 parts by weight on 100 parts of said elastomeric composition, and from 20 to 5 parts by weight of a synthetic rubber consisting essentially either of homopolymers of 2-chloro-1,3-butadiene or copolymers of the former with dienic monomers, selected from the group consisting of butadiene and isoprene, said synthetic rubber having a molecular weight from $2 \times 10^4$ to $10^6$, and a Mooney viscosity from 20 to 100 ML(1+4), as measured at 100° C. according to ASTM specification D 1646, whereby said elastomeric composition has a loss tangent (tan δ) at 0° C. of not less than 0.30 and a loss tangent (tan δ) at 70° C. of not more than 0.16.

5. A tubeless tire as claimed in claim 4, wherein said elastomeric composition has a dynamic storage modulus (E') of not less than 8 MPa at 0° C. and of not less than 5 MPa at 70° C.

6. A tubeless tire as claimed in claim 5, wherein the amount of said synthetic polymer is between 8 and 15 parts by weight, per 100 parts of said elastomeric material.

7. An elastomeric composition containing natural rubber and carbon black for use in the tread band of a vehicle tire containing for 100 parts by weight of a mixture of:

from 80 to 95 parts by weight of natural rubber or a mixture of natural rubber with styrene-butadiene and/or with polybutadiene, the amount of natural rubber being at least 50 parts by weight on 100 parts of said mixture, and from 20 to 5 parts by weight of a synthetic rubber consisting essentially either of homopolymers of 2-chloro-1,3-butadiene or copolymers of the former with dienic monomers, selected from the group consisting of butadiene and isoprene, said synthetic rubber having a molecular weight from $2 \times 10^4$ to $10^6$, and a Mooney viscosity from 20 to 100 ML(1+4), as measured at 100° C. according to ASTM specification D 1646, whereby said elastomeric composition has a loss tangent (tan δ) at 0° C. of not less than 0.30 and a loss tangent (tan δ) at 70° C. of not more than 0.16.

8. An elastomeric composition as claimed in claim 7 having a dynamic storage modulus (E') of not less than 8 MPa at·0° C. and of not less than 5 MPa at 70° C.

9. An elastomeric composition as claimed in claim 8, wherein the amount of said synthetic polymer is between 8 and 15 parts by weight per 100 parts of said elastomeric material.

10. An elastomeric composition as claimed in claim 9 wherein the amount of carbon black is between 45 and 55 parts by weight for 100 parts by weight of the elastomeric material.

11. A method for enhancing the performance of motor vehicle tires in operation at high running speed over long and smooth routes, comprising the steps of:

providing said tires with a tread band made of an elastomeric composition of natural rubber and carbon black, and containing 100 parts by weight of said elastomeric composition of:

from 80 to 95 parts by weight natural rubber or of a mixture of natural rubber with styrene-butadiene and/or with polybutadiene, the amount of natural rubber being at least 50 parts by weight on 100 parts of said mixture, and form 20 to 5 parts by weight of a synthetic rubber consisting essentially either of homopolymers of 2-chloro-1,3-butadiene or copolymers of the former with dienic monomers, selected from the group consisting of butadiene and isoprene, said synthetic rubber having a molecular weight from $2 \times 10^4$ to $10^6$, and a Mooney viscosity from 20 to 100 ML(1+4), as measured at 100° C. according to ASTM specification D 1646, and impressing upon said tread band a tread design adapted to affect the driving characteristics of said tire during operation.

* * * * *